United States Patent [19]
Gelbwachs

[11] Patent Number: 4,829,597
[45] Date of Patent: May 9, 1989

[54] LOW SOLAR BACKGROUND, HIGH SENSITIVITY ACTIVE ATOMIC RESONANCE FILTER FOR UNDERWATER LASER COMMUNICATIONS

[75] Inventor: Jerry A. Gelbwachs, Hermosa Beach, Calif.

[73] Assignee: The Aerospace Corporation, El Segundo, Calif.

[21] Appl. No.: 913,031

[22] Filed: Sep. 29, 1986

[51] Int. Cl.⁴ .............................................. H04B 9/00
[52] U.S. Cl. .................................... 455/617; 307/425; 250/361 C; 250/458.1; 455/609
[58] Field of Search ................ 455/617, 619, 609, 40; 250/458.1, 461.1, 361 R, 361 C, 362, 382, 363 R, 367, 484.1, 393; 307/435, 426, 427, 428, 429, 430; 367/131, 132

[56] References Cited

U.S. PATENT DOCUMENTS

| | | | |
|---|---|---|---|
| 3,795,819 | 3/1974 | Harris | 307/425 |
| 3,801,797 | 4/1974 | Harris et al. | 307/425 |
| 4,058,739 | 11/1977 | Bjorkholm | 307/425 |
| 4,292,526 | 9/1981 | Marling | 250/458.1 |
| 4,313,057 | 1/1982 | Gelbwachs | 250/458.1 |

Primary Examiner—Robert L. Griffin
Assistant Examiner—Leslie Van Beek
Attorney, Agent, or Firm—William J. Burke

[57] ABSTRACT

An optical atomic resonance filter using two pump lasers, a buffer gas and magnesium as an atomic vapor converts underwater signals in the Fraunhofer wavelengths in the green portion of the spectrum to UV light which is readily detectable by conventional photomultiplier tubes.

4 Claims, 2 Drawing Sheets

LOW SOLAR BACKGROUND, HIGH SENSITIVITY ACTIVE ATOMIC RESONANCE FILTER FOR UNDERWATER LASER COMMUNICATIONS

STATEMENT OF GOVERNMENT INTEREST

The invention described herein may be manufactured and used by or for the Government of the United States for governmental purposes without the payment of royalty therefor.

BACKGROUND OF THE INVENTION

1. FIELD OF THE INVENTION

The invention relates to optical filters utilizing atomic resonance transactions and more particularly to a filter which operates at one or more of the magnesium Fraunhofer lines in the green portion of the solar spectrum.

2. DESCRIPTION OF THE PRIOR ART

A critical need exists for the development of a reliable communications system between satellites in space and submarines operating in deep seawater during daylight hours. Atomic resonance filters are attractive due to the sharp filtering capability provided by absorption between atomic levels. This capability mitigates the undesirable effects caused by background solar radiation.

One type of communications system involves use of a satellite-based blue-green laser transmitting in the spectral range in which there is minimum sea water attenuation, namely between 450 to 550 nm, to a submarine-based narrowband atomic resonance filter with a large acceptance angle. Currently being studied is a particular atomic resonance filter which uses cesium or other alkali metals like rubidium or potassium as the atomic vapor in the atomic resonance filter.

There are several problems with the current set of atomic vapor absorption lines that have been proposed to date. The major problem is that the atomic resonance filter located on the submarine may be unable to detect the wavelength of the laser signal from the satellite due to the background noise created by the solar spectrum (400 nm to 700 nm) and by attenuation of the signal by seawater. For daytime transmission, the solar background determines the laser transmitter power necessary to close the communications link with a submerged submarine. Reduction of the effective solar background would yield significant benefits, including lower transmitter power as well as lower weight and volume and increased reliability for the space-based transmitter. Such reductions may be possible by transmitting in one of the very narrow Fraunhofer dips in the solar spectrum. However, the prior art in atomic resonance filters does not disclose the desirability of operating in those dips nor does it disclose an atomic vapor which is capable of operating at one of the precise wavelengths of the Fraunhofer dips.

A second problem with current atomic vapors is that even if the signal is strong enough to overcome the background noise and reaches the atomic filter, the output of the atomic filter may be at a wavelength that is inefficiently converted into electrical impulses. Conventional photomultiplier tubes operate best in the near ultraviolet (UV) region about 400 nm. At longer wavelengths, i.e. the near infrared, which are typically output from current atomic vapors, spectral response of these conventional tubes degrades. Although developmental photomultiplier tubes based on gallium arsenide technology offer promise of being able to detect wavelengths in the deep red (about 850 nm), such tubes are expensive, require cooling, are of limited surface area, and tend to degrade if accidentally exposed to high light levels.

A third problem is that the amount of information which can be transmitted is limited by the response time of the atomic vapor. Response time in an atomic resonance filter refers to the time it takes for the atomic vapor to complete the cycle of excitation and relaxation. A shorter response time of the atomic vapor increases the amount of information which can be transmitted. One factor that can slow reaction time is the presence of radiation trapping, which refers to the reabsorption of emitted light before it has a chance to leave the vapor cell. The current atomic vapors have relatively slow response times, usually in the range of about $10^{-6}$ seconds.

The atomic resonance filters disclosed in Marling, U.S. Pat. No. 4,292,526, have one or more of the above mentioned shortcomings. For example, Marling does not disclose any way other than transmitter power to overcome the solar background. In addition, the response time of cesium atomic vapor taught by Marling is relatively slow, about $2 \times 10^{-6}$ seconds. This is due to severe radiation trapping of the emitted deep red light by the cesium vapor.

A principal object of the present invention is therefore to provide a filter which reduces the power demands of the satellite based transmitter through operation at a Fraunhofer dip in the solar spectrum.

It is another object of this invention to provide an output signal which is in that portion of the spectrum which is efficiently converted into electrical impulses by commercial sensing devices.

It is yet another object of this invention to maximize the amount of information that can be transmitted by a detected signal.

SUMMARY OF THE INVENTION:

The invention is an ultra-high Q optical atomic resonance filter with a wide field of view that uses two pump lasers, a buffer gas and magnesium as an atomic vapor to convert underwater signals in the Fraunhofer wavelengths in the green portion of the spectrum, namely 516.733, 517.270 and 518.362 nm, to UV light, which is readily detectable by conventional photomultiplier tubes.

DETAILED DESCRIPTION

The present invention is based on several principles.

1. There are several narrow gaps within the otherwise continuous solar spectrum. Those gaps are known as Fraunhofer lines and they occur throughout the solar spectrum.

2. Transmissions in the blue-green portion of the spectrum are least attenuated by transmission through seawater. Three Fraunhofer lines, 516.733 nm, 517.720 nm and 518.362 nm, are located in the green portion of the spectrum. In fact, these lines are due to a strong absorption originating from the metastable level of magnesium.

3. Conventional photomultiplier tubes, the most reliable detection devices available, are most effective when detecting wavelengths in the near UV portion of the spectrum, about 380 nm.

Figure 1:
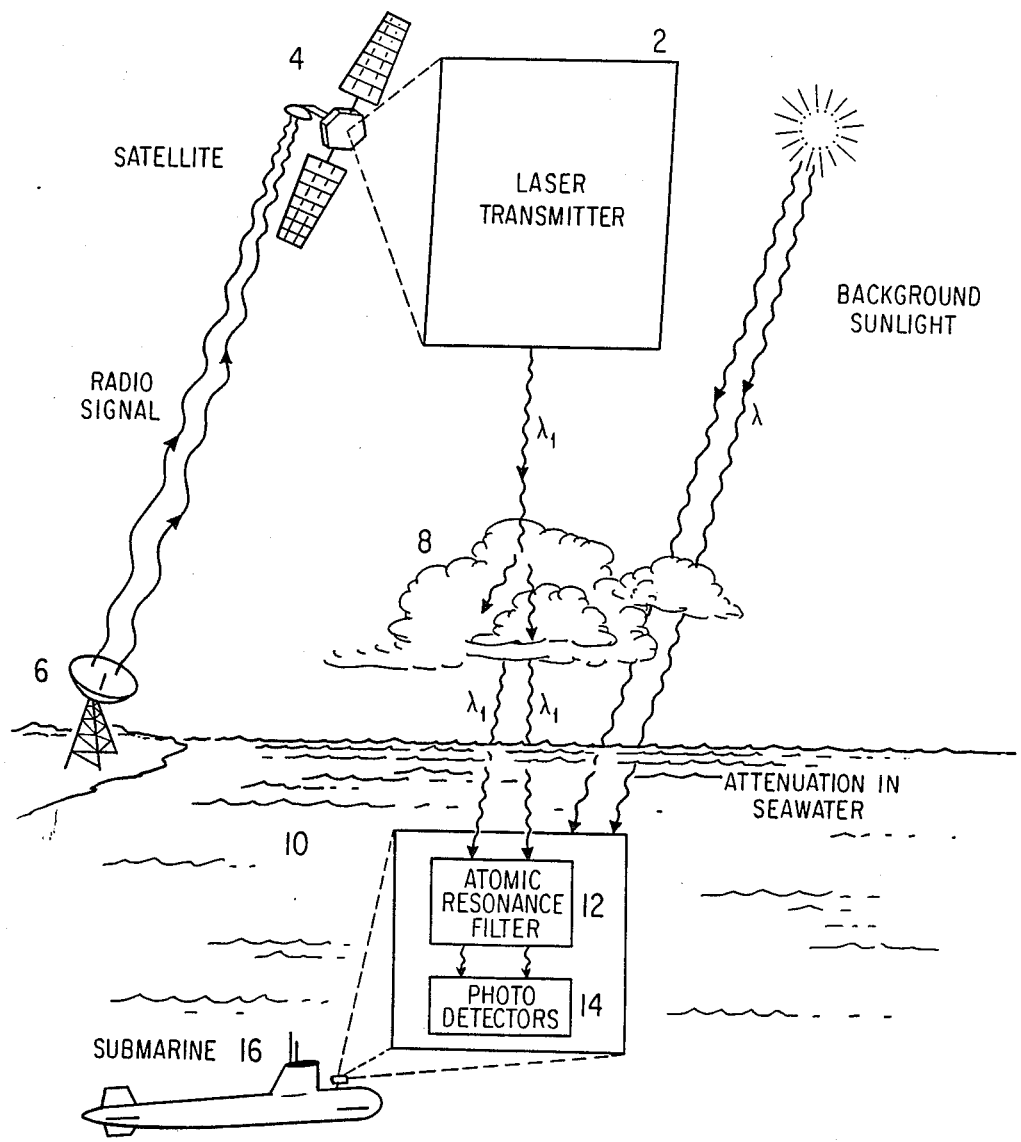
FIG. 1 illustrates an application of the invention as part of a system which includes a satellite-based laser transmitter and a submarine-based atomic resonance filter and detectors.

Referring to FIG. 1, one application of the invention includes a laser transmitter 2 which is located on a satellite 4. On the signal from a ground station 6, laser transmitter 2 transmits a signal at wavelength $\lambda_1$. After passing through the atmosphere 8 and seawater 10, signals at wavelength $\lambda_1$ are filtered by atomic resonance filter 12 which blocks out background sunlight $\lambda$. Filter 12 allows signals at wavelength $\lambda_2$ to pass and those signals are detected by detectors 14 like photomultiplier tubes which are mounted on submarine 16.

Figure 2:
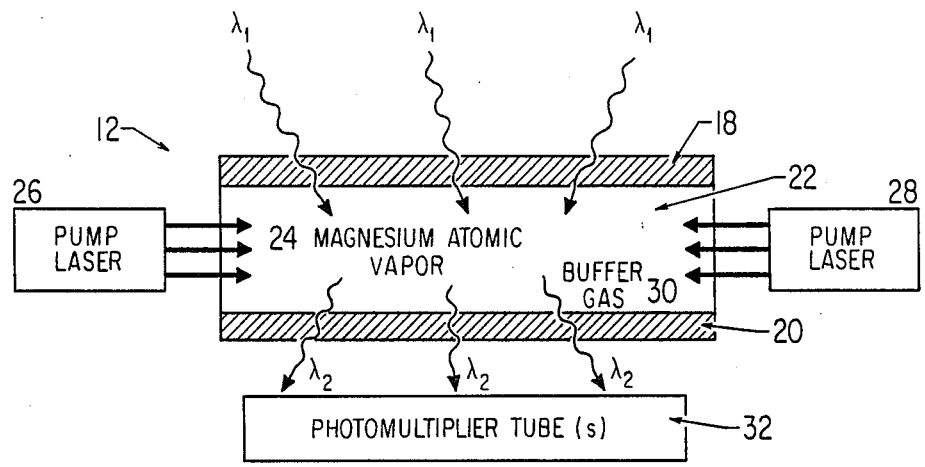
FIG. 2 is an embodiment of the active magnesium atomic resonance filter.
Figure 3:
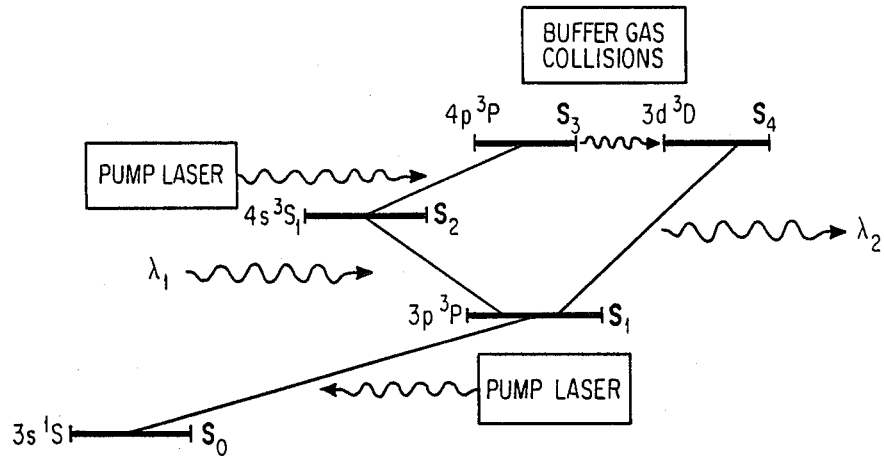
FIG. 3 is an energy level diagram for magnesium in which magnesium atoms are raised to a first excited state by a first pump laser, raised to a second excited state by light to be detected, raised to a third excited state by a second pump laser and returned to the first excited state after radiating UV light.

FIG. 2 illustrates a preferred embodiment of the invention in conjunction with a typical atomic resonance filter. FIG. 3 is a partial energy diagram of magnesium atoms. Referring to FIG. 2, the atomic resonance filter 12 comprises a first optical filter 18 and second optical filter 20 which form a cavity 22 in which magnesium atomic vapor 24 is placed. Incoming light $\lambda_1$ to be detected, i.e. 516.733 nm, 517.270 nm or 518.362 nm, passes through first filter 18, which has a cutoff wavelength $\lambda_{c1}$, where $\lambda_1 > \lambda_{c1}$.

A first pump laser 26 outputting at 457.1 nm raises the atomic vapor 24 in cavity 22 from a ground state $S_0$ to a first excited state $S_1$. As illustrated in FIG. 2, $S_0$ represents $3s^1S$ and first higher state $S_1$ represents $3p^3P^0$. The first optical filter 18 passes the wavelengths greater than 500 nm, including $\lambda_1$. The atomic vapor in state $S_1$ absorbs light $\lambda_1$ and moves upward to state $S_2$ ($4s^3S$). A second pump laser 28 outputting at 1.503 $\mu$m shifts the atomic vapor in state $S_2$ upward to state $S_3$ ($4p^3P^0$). Collisions between atomic vapor in state $S_3$ and buffer gas 30 (typically a rare gas such as helium or argon) shift the atomic vapor into a nearby level $S_4$ ($3d^3D$). From that level, the vapor atoms rapidly return to metastable level state $S_1$ and radiate UV light at $\lambda_2$, which is at about 383 nm.

The second optical filter 20 passes the UV light at $\lambda_2$ but excludes longer wavelengths. The second filter 20 has a cutoff wavelength $\lambda_{c2}$, where $\lambda_2 < \lambda_{c2} < \lambda_{c1}$. The $\lambda_2$ emission then strikes the detecting surfaces of photomultiplier tube 32. It is important to note that UV light at $\lambda_2$ which strikes the detecting surface of tube 32 at a wavelength of about 383 nm is in the optimum wavelength region for sensitive detection by photomultiplier tubes 32.

By adjusting the intensity of laser pump 28 and the pressure of the buffer gas 30, the magnesium energy transfer can be made highly efficient. Typical laser intensities and buffer gas pressures are 1 Watt/cm² and 1 atmosphere, respectively. For these settings of intensity and pressure, the calculated branching ratio of UV photons emitted to green photons absorbed is about 90 percent.

It should be noted that the preferred embodiment is suited for use in any application where it is desired to use a laser to communicate in the presence of a solar background. Such applications include communications between transmitters/receivers located underwater or above water, either in the atmosphere or in space.

Although the invention has been described in terms of a preferred embodiment, it will be obvious to those skilled in the art that alterations and modifications may be made without departing from the invention. Accordingly, it is intended that all such alterations and modifications be included within the spirit and scope of the invention as defined by the appended claims.

What is claimed is:

1. A method for communicating through seawater at a wavelength $\lambda_1$ comprising of steps of:
   a. transmitting light at a wavelength $\lambda_1$ centered at a Fraunhofer line in the blue-green portion of the spectrum;
   b. providing a first optical filter having an optical transmission wavelength greater than a first cutoff wavelength $\lambda_{c1}$, where $\lambda_1 > \lambda_{c1}$;
   c. providing a second optical filter spaced apart from the first optical filter and having an optical transmission wavelength less than a second cutoff wavelength $\lambda_{c2}$, where $\lambda_{c2} < \lambda_{c1}$;
   d. providing magnesium vapor positioned between and adjacent to the first and second optical filters;
   e. providing a buffer gas positioned between and adjacent to the first and second optical filters wherein the buffer gas is a noble gas;
   f. pumping the atomic vapor to a first excited state from which light can be absorbed at a narrowband wavelength centered at a Fraunhofer line $\lambda_1$, wherein $\lambda_1$ is 516.733 nm, 517.270 nm or 518.362 nm, thereby raising the atomic vapor to a second excited state;
   g. pumping the atomic vapor to a third excited state, whereby collisions with the buffer gas raise the atomic vapor to a fourth excited state, the atomic vapor at the fourth excited state exhibiting a fluorescence transition to the second excited state by emission of light at a fluorescence wavelength $\lambda_2$, where $\lambda_2 < \lambda_{c2}$ and where $\lambda_2$ is in the near UV portion of the spectrum and whereby light at the absorption wavelength $\lambda_1$ incident on the first optical filter is transformed to light at the fluorescence wavelength $\lambda_2$ and emitted through the second optical filter;
   h. detecting light at the fluorescence wavelength $\lambda_2$ emitted through the second optical filter.

2. The method claimed in claim 1 wherein the magnesium vapor is pumped to the first excited state by a 457.1 nm laser.

3. The method of claim 1 wherein the magnesium vapor is pumped to the fourth excited state by a 1.503 $\mu$m laser and by buffer gas collisions.

4. The method claimed in claim 1 wherein $\lambda_2$ is about 383 nm.

* * * * *